United States Patent [19]
Le Bihan

[11] Patent Number: 5,128,924
[45] Date of Patent: Jul. 7, 1992

[54] DEVICE FOR EVALUATING THE THROUGHPUT OF VIRTUAL CIRCUITS ON AN ASYNCHRONOUS TIME-DIVISION MULTIPLEX TRANSSMISION CHANNEL

[75] Inventor: Denis Le Bihan, Lanmerin, France

[73] Assignee: Alcatel Cit, Paris, France

[21] Appl. No.: 596,185

[22] Filed: Oct. 12, 1990

[30] Foreign Application Priority Data

Oct. 12, 1989 [FR] France .................. 89 13342

[51] Int. Cl.⁵ .......................... H04J 1/16; H04J 3/24
[52] U.S. Cl. ...................................... 370/13; 370/60; 370/94.1
[58] Field of Search .............. 370/94.1, 60, 13, 17; 379/133, 134

[56] References Cited

U.S. PATENT DOCUMENTS

| | | | |
|---|---|---|---|
| 4,475,192 | 10/1984 | Fernow et al. | 370/94 |
| 4,484,326 | 11/1984 | Turner | 370/94.1 |
| 4,769,810 | 9/1988 | Eckberg, Jr. et al. | 370/60 |
| 4,769,811 | 9/1988 | Eckberg, Jr. et al. | 370/60 |
| 4,896,316 | 1/1990 | Lespanol et al. | 370/60 |
| 4,993,024 | 2/1991 | Quinguis et al. | 370/94.1 |
| 5,007,048 | 4/1991 | Kowalk | 370/60 |

FOREIGN PATENT DOCUMENTS

0169017  1/1986  European Pat. Off. .

OTHER PUBLICATIONS

IEEE Journal on Selected Areas in Communications, vol. SAC-5, No. 8, Oct. 1987, pp. 1315-1326, IEEE, New York, US; M. G. H. Katevenis: "Fast switching and fair control of congested flow in broadband networks".

*Primary Examiner*—Douglas W. Olms
*Assistant Examiner*—H. Kizou
*Attorney, Agent, or Firm*—Sughrue, Mion, Zinn, Macpeak & Seas

[57] ABSTRACT

The incoming cells of a input asynchronous time-division multiplex channel (mtr) are counted by a counter (FFB) assigned to each virtual circuit which is incremented on each incoming cell of the virtual circuit and decremented periodically. Clock signals define consecutively numbered cell times (ntc). Queue and chaining table (FAVE, FCVN) define a cell time queue (FAF, FAL, FAV) specific to each of the cell times, a virtual circuit being assignable to a cell time by writing its identifier into the corresponding cell time queue. A controller (MC) uses the content of the cell time queues (FAF, FAL, FAV) and, for each cell time, identifies a virtual circuit to be processed and decrements the counter (FFB) belonging to this virtual circuit. The controller further includes arrangements whereby any virtual circuit whose counter is not idle is assigned to one of the cell times to be decremented by virtue of the arrival of this cell time.

13 Claims, 1 Drawing Sheet

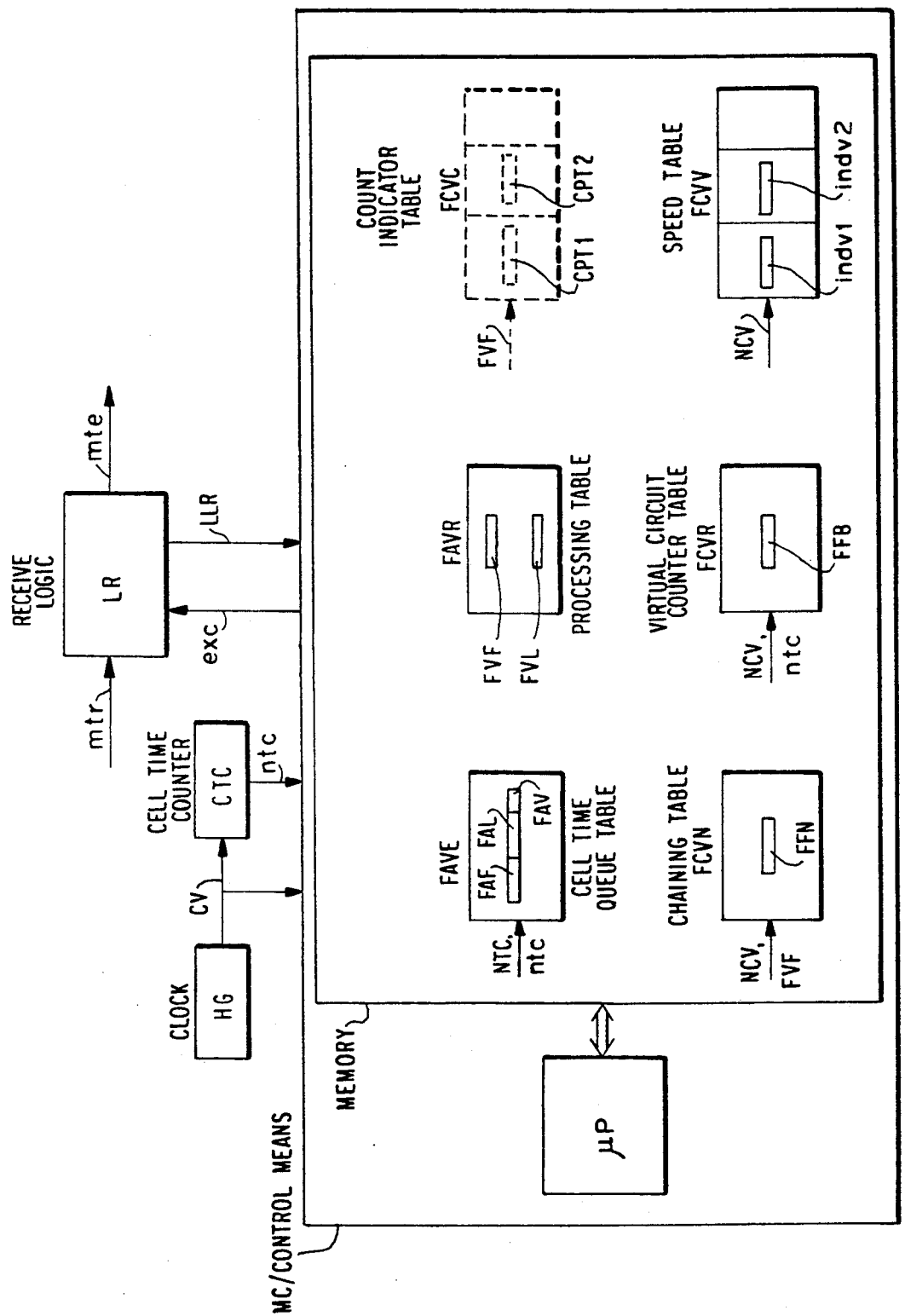

DEVICE FOR EVALUATING THE THROUGHPUT OF VIRTUAL CIRCUITS ON AN ASYNCHRONOUS TIME-DIVISION MULTIPLEX TRANSSMISION CHANNEL

BACKGROUND OF THE INVENTION

The present invention concerns a device for evaluating the throughput of virtual circuits on an asynchronous time-division multiplex transmission channel.

An asynchronous time-division multiplex transmission channel carries data messages in digital data structures called cells. Each cell has a header comprising, for example, four 8-bit characters and a message body comprising a specified number of characters (32, for example). A continuous stream of such cells is carried by the transmission channel. If there is no message to be transmitted the transmission channel carries an "empty" cell, that is to say a cell with the same format as a message cell and containing conventional, easily recognizable information. Steps are taken to maintain a sufficient proportion of such empty cells in the stream of message cells; they are used, in particular, to synchronize the receiving end to the cell format.

The header of each message cell contains (on two characters, for example) information defining for the receiving end the direction in which the message body must be forwarded. The other two characters of the header contain service information and, in particular, code control and error detection information relating to the two destination characters. The same information is contained in the headers of irregularly spaced cells which have the same destination. It therefore identifies, so to speak, a virtual circuit occupying part of the transmission capacity of the transmission channel. More generally, this virtual circuit contributes a certain throughput on the transmission channel, measured in cells per unit time, for example, and this throughput fluctuates. A specific object of the invention is to evaluate the throughput as accurately as possible.

The transmission channel supports at any time a multiplicity of virtual circuits whose cells are interleaved in an irregular way by what is usually called asynchronous time-division multiplexing. The different virtual circuits have different, fluctuating throughputs. The sum of these throughputs is limited by the maximum throughput of the transmission channel, and also fluctuates. This leaves room for transmitting empty cells.

Also, the number of virtual circuits that can be separately identified depends on the number of bits assigned to this information in the cell header. The maximum number of virtual circuits is determined, among other things, by the number of virtual circuits obtained by dividing the maximum throughput of the transmission channel by the minimum throughput of a data source that can utilize a virtual circuit. This number is very large, for example 64 K.

However, asynchronous time-division multiplex transmission is used in a very wide field of applications and the throughputs of sources that can utilize a virtual circuit cover a vast range of throughputs (for example, from a few kilobits to several hundreds of megabits per second). The number of active virtual circuits will therefore usually be much less than the maximal number.

The above definition of asynchronous time-division multiplex transmission must not be limited to the case where all the cells are the same length. It is feasible to use cells of different lengths which are all multiples of a base length and in the context of the present invention the necessary adaptations will be evident to those skilled in the art.

An asynchronous time-division multiplex transmission channel is therefore designed to carry data supplied by sources with extremely varied and fluctuating throughputs. The forward switching and transmission equipments route the messages contained in the cells to their destination. To prevent the risk of forward congestion, it is necessary to prevent any source deliberately or accidentally contributing a throughput greater than the overall throughput assigned to it, even temporarily.

One known solution to this problem is known as "repression". The transmission channel is prevented from routing any cell regarded as being in excess of the overall throughput assigned to the virtual circuit, or at the very least the excess cell is marked as such so that it can be rejected further along the link if congestion occurs.

The application of a solution of this kind requires measurement of the throughput on the virtual circuit, this measurement possibly leading to the marking of a supernumerary cell.

The document FR-A-2 616 024 discloses a throughput measuring device which comprises a counter incremented by one step on receiving a cell of the virtual circuit to which it is assigned and decremented by one step on each clock pulse. If the virtual circuit throughput is low the counter is decremented more frequently than it is incremented and eventually locks in a minimal position; on the other hand, if the frequency of the cells of the virtual circuit is higher in the long term than the frequency of the clock pulses, the counter eventually locks into a maximal position and can then cause the marking of the cell as a supernumerary cell as mentioned above.

A system of this kind has the disadvantage that it can be applied only to a limited number of virtual circuits by virtue of the time needed to decrement the counters. It is not applicable to the previously envisaged situation in which the number of virtual circuits is very large.

SUMMARY OF THE INVENTION

The present invention therefore proposes a device for evaluating the throughput of virtual circuits carried by an asynchronous time-division multiplex transmission channel in which the incoming cells of an input asynchronous time-division multiplex channel including a header containing a destination indicator that can be treated as a virtual circuit identifier are counted by a counter assigned to each virtual circuit which is incremented for each incoming cell of the virtual circuit and which is periodically decremented if it is not in a rest condition, which device does not suffer from this limitation.

According to an essential characteristic of the invention, the device comprises clock means defining consecutively numbered cell times corresponding to successive time intervals during which incoming cells are received on the input asynchronous time-division multiplex transmission channel, queue means defining a cell time queue specific to each of said cell times, a virtual circuit being assignable to a cell time by writing its identifier into the corresponding cell time queue, control means using the content of said cell time queues and, for each cell time, being able to identify a virtual circuit to be processed and to decrement the counter belonging to this virtual circuit, these control means further comprising arrangements whereby any virtual circuit whose counter is not idle is assigned to one of the cell times to be decremented by virtue of the arrival of this cell time.

According to another characteristic of the invention, said control means are such that in each cell time the content of the cell time queue associated with the cell time is transferred into a processing queue, each virtual circuit identifier from the processing queue being used in turn to decrement the counter of the virtual circuit that it designates.

According to another characteristic of the invention, said control means are such that after the counter of a virtual circuit is decremented and if the counter has not reached its idle state the identifier of this virtual circuit is written into a cell time queue which is selected allowing for a speed indicator attached to the virtual circuit in question.

According to another characteristic of the invention, said control means are such that after the counter of a virtual circuit is decremented and if the counter has not reached its idle state the identifier of this virtual circuit is written into a cell time queue which is selected allowing for a speed indicator attached to the virtual circuit in question and data dependent on the observed throughput of this virtual circuit.

According to another characteristic of the invention, said control means are such that when an incoming cell is received and if the counter of the virtual circuit is idle the identifier of this cell time is written into a cell time queue which is selected allowing for a speed indicator attached to the virtual circuit in question.

According to another characteristic of the invention, said control means are such that when an incoming cell is received and if the counter of the virtual circuit is idle the identifier of this cell time is written into a cell time queue which is selected allowing for a speed indicator attached to the virtual circuit in question and data dependent on the observed throughput of this virtual circuit.

According to another characteristic of the invention, said data dependent on the throughput is the position occupied by the counter of the virtual circuit in question.

According to another characteristic of the invention, a count indicator is provided for each virtual circuit and the control means are such that this count indicator is incremented when said counter of a virtual circuit is decremented if said counter state is in a predetermined range of states, and decremented if said counter state is below this range of states.

According to another characteristic of the invention, a count indicator has a maximal value reached if said range of states is reached on a majority basis, said control means further comprising means which then cause the use of a speed indicator corresponding to a reduction in the speed at which said counter is decremented.

According to another characteristic of the invention, said control means are such that when a virtual circuit counter is decremented and if this counter has not returned to its rest state the identifier of the virtual circuit to which it belongs is written into a cell time queue which is selected on the basis of the current cell time.

According to another characteristic of the invention, said control means are such that when a virtual circuit counter is decremented and if this counter has not reached its rest condition the identifier of the virtual circuit to which it belongs is written into a cell time queue which is selected on the basis of the cell time to which the virtual circuit in question has previously been assigned, the identifier of which has been stored for this purpose.

According to another characteristic of the invention, means are provided for detecting when the counter of a virtual circuit has reached a maximum position to prevent it overshooting the latter and to cause the transmission of a signal indicating that the throughput of the virtual circuit is excessive.

BRIEF DESCRIPTION OF THE DRAWING

The drawing shows one embodiment of a throughput evaluation device in accordance with the present invention.

DETAILED DESCRIPTION OF THE INVENTION

An input asynchronous time-division multiplex channel mtr is connected to receive logic LR. This multiplex channel is of the type mentioned in the preamble, for example. It supplies successive incoming cells including a header containing a virtual circuit number.

An output asynchronous time-division multiplex channel mte is connected to the receive logic LR. This channel is of the same type as the input channel mtr. The receive logic LR supplies it with outgoing cells which normally comprise the successive incoming cells, possibly delayed and modified as explained later.

The device in accordance with the invention comprises means now to be described for evaluating the spacing between the cells of each virtual circuit, in other words the throughput of each virtual circuit carried by the multiplex channels mtr, mte.

These means essentially comprise a clock HG, a cell counter CTC, memory areas FAVE, FAVR, FCVC, FCVN, FCVR, FCVV, and control means MC.

The clock HG is synchronized to the signals received on the incoming multiplex channel mtr by known means (not shown) and provides signals including a signal CV which identifies the start of a repetitive time interval referred to as the cell time whose duration is the time to receive or transmit one cell.

The cell time counter CTC is a cyclic counter with N states (where N is an integer and preferably equal to a power of 2) which supplies, in each cell time, a cell time number which takes the values from 0 through $N-1$ in succession.

The receive logic LR supplies on a line LLR the identifier NCV of the virtual circuit to which the received cell belongs.

The memory areas just mentioned comprise:
  a cell time queue table FAVE with N entries, one for each cell time number; each entry is used to build a cell time queue and therefore contains the identifier FAF of a first virtual circuit requesting processing, the identifier FAL of a last virtual circuit requesting processing, and a bit FAV used to mark an empty queue,
  a processing table FAVR containing the identifier FVF of a first virtual circuit requesting processing and the identifier FVL of a last virtual circuit requesting processing,
  a virtual circuit counter table FCVR having one memory location per virtual circuit, each containing a count FFB of the number of cells received on this virtual circuit and requiring evaluation (these memory locations will sometimes be referred to hereinafter as counters FFB), a speed table FCVV having one memory location per virtual circuit, each containing at least two speed indicators indv1 and indv2 to be used in relation to this virtual circuit as will be explained later, and a chaining table FCVN having one memory location per virtual circuit, each containing the identifier FFN of another virtual circuit to which the virtual circuit in question is chained.

When a cell is received on the incoming channel mtr the clock HG supplies a signal CV, the receive logic LR supplies over the link LLR the identifier NCV of the virtual circuit to which the cell belongs, obtained from the cell header, and the counter CTC supplies a cell time interval number ntc. In response to this the control device MC reads the table FCVR using the identifier NCV of the virtual circuit and obtains the number FFB of cells of the virtual circuit already received and not yet processed. This number is incremented and then rewritten into the same location.

The number FFB is also tested, for example before it is incremented. If it is not equal to zero, no specific action is necessary at this time. The number of cells received and which should instigate the evaluation processing is simply increased by one unit.

If the number FFB is equal to zero or, in other words, if the counter FFB is idle, the virtual circuit to which the received cell belongs must be assigned to a cell time for evaluation processing. To this end the control device MC writes the virtual circuit identifier NCV into the queue table FAVE. The control device MC addresses the table FAVE using an address indicator NTC derived from the current cell time number, supplied by the counter CTC, for example by adding a constant value. At the location in the table FAVE designated by this address indicator NTC the control device MC reads the identifier FAF of the first virtual circuit already assigned to this cell time, the identifier FAL of the last virtual circuit already assigned to this cell time and the bit FAV. The control device MC stores as the new identifier FAL the number NCV of the virtual circuit in question. The identifier FAL is also used to address the table FCVN and to write into it the identifier NCV as a chaining indicator FFN. However, if the bit FAV indicates that the queue was empty, this latter operation is omitted and the identifier NCV is written also as the identifier FAF into the table FAVE at the address NTC. The bit FAV is complemented to indicate that the queue is no longer empty.

The number of the virtual circuit in question is therefore chained in a queue associated with a future cell time, the start of which is the identifier FAF and the end of which is the identifier FAL, this chaining being materially represented by the writing of virtual circuit numbers into the table FCVN; this method is conventional.

As an alternative, instead of chaining the virtual circuit identifier into a future cell time selected by adding a constant value to the current cell time number ntc. the table FCVV is also read and supplies from a location belonging to the virtual circuit concerned, read in response to the virtual circuit number NCV, a speed indicator indv1 which is added to the current cell time number ntc. The sum ntc+indv1 then provides the address NTC. The speed indicator indv1, which can be a value of the cell spacing to be applied when the virtual circuit throughput is low, is used to adopt a low speed of decrementing the counter FFB.

Still in relation to testing the state of the counter FFB, the invention provides for detecting the extreme position reached by the counter FFB in the case of a throughput that is persistently too high. The control means MC, detecting this extreme position, are adapted to supply a signal exc which is transmitted to the receive logic LR. It can be used to modify the next cell of this virtual circuit received from the incoming multiplex link before it is transmitted on the outgoing link in order to make it appear to be exceeding the permitted throughput of the virtual circuit in question.

All the cells received give rise to the operations that have just been described. A first cell of a virtual circuit which arrives when the counter FFB of the virtual circuit is idle is chained in the manner that has just been explained. Subsequent cells, which arrive when the counter is no longer idle, are not chained in this way; they are chained later and differently, as will now be explained in the description of the evaluation process.

In each cell time the control means MC carry out an evaluation process of which one essential element is decrementing the counter FFB of a virtual circuit. Using the number ntc supplied by the counter CTC, the control device MC reads the table FAVR. The indicator FVF designates a virtual circuit whose counter FFB is not idle, in other words which has supplied a cell for which the evaluation processing has not yet been done. This indicator is used to read the table FCVR and the counter FFB is decremented; it can by this process be reduced to zero and there is no need to chain the virtual circuit again into the queue of a cell time.

The same indicator FVF is used to address the chaining table FCVN. This table supplies at the address indicated the identifier FFN of a subsequent virtual circuit in the transmit queue which is then written into the table FAVR, as the new indicator FVF, for processing the next virtual circuit. The combination of the tables FAVR and FCVN therefore supplies a list of the virtual circuits requiring evaluation processing. If this is empty, no processing is done.

The control device MC addresses the queue table FAVE using the number ntc in order to read the identifier FAF at the start of the queue of virtual circuits associated with the cell time in question and the identifier FAL at its end, unless the bit FAV indicates that the queue is empty. The identifier FVL obtained from the table FAVR is used to address the table FCVN. The identifier FAF is written at the address in question of the table FCVN and the identifier FAL is written into the table FAVR as the new indicator FVL. The bit FAV is complemented in the location just read of the table FAVE to indicate that the queue is empty. This achieves the chaining of all of the queue associated with the cell time in question into the queue of virtual circuits for which evaluation processing is required. Note that this chaining can be instead be done before processing the queue for processing.

Of course, if the bit FAV initially read in the table FAVE indicates that the cell time queue in question is empty the operations of chaining into the processing queue as just described are omitted.

Because evaluation processing has just been done for a virtual circuit, it remains to initialize possible subsequent evaluation processing for the same virtual circuit. Using the identifier FVF of this virtual circuit obtained from the table FAVR, the counter table FCVR and the speed table FCVV are read. The former indicates the number of cells of the virtual circuit awaiting evaluation. The higher this number, the higher the rate at which the counter FFB of the virtual circuit must be decremented, that is to say the shorter the interval between decrementing operations. To give an example, the table FCVV supplies two indicators indv1 and indv2, each associated with one level of throughput of the virtual circuit. These indicators may be the number of cell times which must elapse before the counter FFB of the virtual circuit is decremented again. If the throughput is low the indicator indv1 is applied. The control device MC calculates the sum ntc+indv1 and uses it to address the table FAVE. The identifier FAL of the last virtual circuit associated with this cell time is used to address the table FCVN and to write into it at this address the identifier FAF of the virtual circuit concerned, read from the table FAVE at the address ntc. This latter identifier is then written into the table FAVE at the address ntc+indv1 as the new address FAL. The bit FAV at the same address is complemented, if necessary, to indicate that the queue is not empty. These operations chain the virtual circuit to the cell time ntc+indv1. Of course, if the throughput of the virtual circuit is higher the indicator indv2 may be applied and cause chaining of this virtual circuit associating it with a nearer cell time ntc+indv2, and so on. The intervals specified by the indicators indv1, indv2, etc will allow for the transmission speed of the virtual circuit. Note that this interval is at most equal to N, which is not a problem, even for low-throughput virtual circuits.

An additional feature of the regulator device in accordance with the invention, as just described, is shown in dashed outline in the figure. It is a table FCVC having one location per virtual circuit containing at least one count indicator CPT1, CPT2, etc. This memory is addressed when a cell is processed using the indicator FVF supplied by the processing queue (table FAVR). The count indicator CPT1 is decremented or incremented according to the number of cells received from the virtual circuit and not yet evaluated, as indicated by the counter FFB of the table FCVR. The counter CPT1 is decremented (down to zero only) if the number supplied by the counter FFB is small and leads, for example, to the use of the spacing indicator indv1. It is incremented if this number is higher. Other similar count positions may be associated with higher throughputs. Each additional count indicator will have a reduced capacity relative to its predecessors. These various count indicators will therefore each represent an average presence of the throughput of the incoming circuit at a given level, the set of these count indicators defining a throughput-time limiting curve. If the virtual circuit throughput remains too long at a given level, the corresponding count indicator will reach its maximum value. It is then a simple matter to apply a mandatory limit to the time for which the throughput can, on average, remain at any given level by defining the count capacity of the corresponding count indicator and by arranging things so that, if the count indicator of this level reaches its maximum value, instead of applying the spacing indicator which applies normally for this level (indv2, for example), a spacing indicator is chosen instead which results in a lower decrementing rate (indv1, for example). The result will be that the counter FFB of the virtual circuit will count quickly if the input throughput is not reduced and, as a consequence of this, subsequent refusal of supernumerary cells.

To summarize, each incoming cell is counted by incrementing the counter FFB of the virtual circuit to which it belongs. A cell time queue is associated with each cell time. An evaluation queue is associated with all of the multiplex link. It is supplied by the cell time queues.

A first incoming cell of a given virtual circuit firstly causes the virtual circuit to be written into the queue of a cell time after that in which it arrives. When this cell time is reached, the corresponding cell time queue is added to the end of the evaluation queue. When its turn comes in the evaluation queue, the virtual circuit is evaluated, this processing consisting primarily in decrementing the counter FFB of this virtual circuit and in incrementing or decrementing the appropriate count indicator or indicators of this virtual circuit.

If the virtual circuit throughputs are low, each incoming cell of a virtual circuit is evaluated before the next cell arrives, with the result that the counter FFB of the virtual circuit remains idle.

A manager device (not shown) can take note from time to time of the state of the counters of the table FCVF. If any counter is idle, this device may conclude that the throughput of the virtual circuit is below the minimal throughput associated with the virtual circuit in the form of the speed indicator indv1.

For a virtual circuit supplying a higher throughput, the counter FFB quits its idle condition. If no other speed indicator is used, the condition of the counter FFB merely expresses (as a number of cells) the excessive throughput of the virtual circuit relative to a throughput defined by the speed indicator indv1. The capacity of the counter characterizes the extent of the tolerance in this respect. If this is exceeded, an incoming cell finds the counter FFB at its extreme position. This causes the signal exc to be supplied to characterize this latter cell as being a supernumerary cell.

The use of multiple speed indicators as a function of the observed throughput of the virtual circuit, for example as a function of the range of states reached by the counter FFB of this virtual circuit, makes it possible to evaluate the crossing of several throughput thresholds rather than one. The number of remaining states of the counter being lower at each new throughput threshold crossed, the extent to which exceeding this threshold is allowed, expressed as a number of cells, is lower each time, which amounts to allocating to the virtual circuit "throughput-excess" pairs expressing the fact that the virtual circuit is allowed to supply increasing throughputs, each with a tolerance lower than its predecessors. The reading of the counter by the manager device always amounts to an evaluation of the throughput of the virtual circuit above the previously mentioned minimal threshold, but requires interpretation according to the speed indicators for this virtual circuit which condition the changing state of the counter.

The addition of count indicators CPT1, CPT2, etc allows the persistence of the virtual circuit throughput at a give level to be included in the throughput evaluation.

An alternative way of evaluating the throughput will now be described. It will be remembered that immediately a cell arrives before the previous cell has had the evaluation processing carried out the second cell is simply counted. When the processing required by the first cell is completed, the presence of a second cell in the count held by the counter FFB causes the virtual circuit to be written into a queue of a future cell time determined from the current cell time and a speed indicator specific to the virtual circuit. The second cell therefore gives rise to evaluation processing with a particular minimal spacing relative to the former. The same will apply to subsequent cells, if necessary, until the processing originally described is reverted to. Note that it would be a simple manner to impart to the processing operations for the received cells a particular mean spacing rather than a minimal spacing. It is sufficient to determine the cell time with which a virtual circuit is associated for the processing of a subsequent cell, at the time of processing the current cell, not from an expression such as ntc+indv1 or ntc+indv12, as explained above, in which ntc designates the current cell time, but using an expression such as NTC(i+1)=NTCi+indv1 or NTCi+indv2, in which NTCi is the cell time to which the virtual circuit was previously assigned. To this end it is sufficient to hold the information NTCi in an additional table similar to the table FCVF and to read it when calculating NTC(i+1). In this way the consecutive cells of the same virtual circuit will be assigned cell times regularly spaced by indv1 or indv2 and will therefore be processed with a real spacing based on average on a regular spacing and affected only by irregularities of the cell time queues. Of course, the above expression NTC(i+1) is applicable only if it supplies a value designating a cell time after the current cell time ntc. For this reason means may be provided for correcting the value NTC(i+1) so that this is so in all cases.

The receive logic LR and the control device MC are essentially logic type data processing devices. There is no need to describe them in detail. In the current state of the art their implementation will be evident to those skilled in this art; it will be based on the use of programmed processors offering performance matched to the available times for carrying out the stated operations, allowing for the throughput of the multiplex links. According to requirements in terms of performance, a greater or lesser number of processors may be provided, sharing the described operations between them. Also, a device of this kind is feasible operating to the benefit of multiple incoming channels and multiple outgoing channels. Consideration may even be given to associating it with or incorporating it in an asynchronous time-division multiplex channel switch.

Similarly, no mention has been made of the initialization operations which are obviously necessary and whose implementation is part of the prior art in this field.

Generally speaking, it is obvious that the foregoing description have been given by way of nonlimiting example only and that numerous variations thereon are feasible without departing from the scope of the invention.

I claim:

1. A device for evaluation the throughput of virtual circuits carried by an asynchronous time-division multiplex transmission channel carrying cells each including a header containing a destination indicator forming a virtual circuit identifier, said device comprising:
   receive means for receiving incoming cells and providing a virtual circuit identifier identifying the virtual circuit to which the cell belongs;
   clock means for defining consecutively numbered cell times corresponding to successive time intervals during which incoming cells are received on the input asynchronous time-division multiplex transmission channel; and
   a counter for counting the incoming cells associated with each virtual circuit, said counter being incremented for each incoming cell of the associated virtual circuit and being periodically decremented; and
   control means for processing each virtual circuit by controlling the counter associated with each virtual circuit and evaluating the throughput of each virtual circuit on the basis of the content of the associated counter, said control means being responsive to said cell identifier and said clock means for evaluating said throughput, said control means:
   (i) maintaining a cell time queue for each said cell time,
   (ii) assigning each virtual circuit, whose counter is not idle, to a cell time by writing the virtual circuit identifier identifying said each virtual circuit into a corresponding cell time queue, so that each cell time queue comprises cell identifiers identifying virtual circuits associated with said each cell time queue, and
   (iii) upon the arrival of each cell time, identifying a virtual circuit to be processed from said cell time queue and decrementing the counter associated with said virtual circuit to be processed.

2. A virtual circuit throughput evaluation device according to claim 1, wherein said control means maintains a processing queue containing said virtual circuit identifiers representing virtual circuits awaiting processing, and in each cell time transfers the content of the cell time queue associated with said each cell time into said processing queue, said control means decrementing the counter associated with each virtual circuit in accordance with the cell identifiers in the processing queue.

3. A virtual circuit throughput evaluation device according to claim 2, wherein after a given counter associated with a given virtual circuit is decremented and if said given counter has not reached an idle state indicating an idle condition of said given virtual circuit, said control means determines a speed indicator for saie given virtual circuit representing a speed at which said given counter is to be decremented and writes the virtual circuit identifier identifying said given virtual circuit into a cell time queue which is selected in accordance with said speed indicator.

4. A virtual circuit throughput evaluation device according to claim 3, wherein said speed indicator is determined in accordance with evaluated throughput of said given virtual circuit.

5. A virtual circuit throughout evaluation device according to claim 3, wherein when a given counter associated with a given virtual circuit is in an idle state and when an incoming cell associated with said given virtual circuit is received, said control means determines a speed indicator for said given virtual circuit representing a speed at which said given counter is to be decremented and writes the cell identifier identifying said given virtual circuit into a cell time queue which is selected in accordance with said speed indicator.

6. A virtual circuit throughput evaluation device according to claim 3, wherein said speed indicator is determined in accordance with evaluated throughput of said given virtual circuit.

7. A virtual circuit throughput evaluation device according to claim 4, wherein said evaluated throughput corresponds to the content of said given counter.

8. A virtual circuit throughput evaluation device according to claim 6, wherein said evaluated throughput corresponds to the content of said given counter.

9. A virtual content throughput evaluation device according to claim 7, wherein said control means maintains a count indicator for each virtual circuit and increments said count indicator for said given virtual circuit when said given counter is decremented if a value in said given counter is within a predetermined range, and decrements said count indicator for said given virtual circuit when said given counter is decremented if a value in said given counter is not below said predetermined range.

10. A virtual circuit throughput evaluation device according to claim 9, wherein said control means determines a speed indicator corresponding to a reduction in the speed at which said given counter is to be decremented if said count indicator reaches a predetermined value.

11. A virtual circuit throughput evaluation device according to claim 3, wherein when said given counter is decremented and if this counter has not reached said idle state, said control means writes the identifier of said given virtual circuit into a cell time queue selected on the basis of the cell time currently defined by said clock means.

12. A virtual circuit throughput evaluation device according to claim 3, wherein when said given counter is decremented and if this counter has not reached said idle state, said control means writes the identifier of said given virtual circuit into a cell time queue selected on the basis of the cell time to which said given virtual circuit has previously been assigned.

13. A virtual circuit throughput evaluation device according to claim 9, wherein said control means includes means for detecting when said given counter has reached a predetermined value and for providing a signal indicating that the throughput of said given virtual circuit is excessive.

* * * * *